United States Patent [19]

Shoemaker

[11] Patent Number: 4,796,362
[45] Date of Patent: Jan. 10, 1989

[54] COMBINED CENTERLINE TARGET AND GRADE CHECKER APPARATUS

[76] Inventor: Jack W. Shoemaker, 9430 Woodsboro Pike, Walkersville, Md. 21793

[21] Appl. No.: 89,809

[22] Filed: Aug. 27, 1987

[51] Int. Cl.⁴ .............................................. G01C 15/00
[52] U.S. Cl. ........................................ 33/1 H; 33/286; 33/293
[58] Field of Search ................. 33/293, 295, 1 H, 286; 356/153, 154

[56] References Cited

U.S. PATENT DOCUMENTS

| | | | |
|---|---|---|---|
| 3,631,601 | 1/1972 | McNulty | 33/46 |
| 3,815,250 | 6/1974 | Roodvoets et al. | 33/1 H |
| 3,857,639 | 12/1974 | Mason | 356/156 |
| 3,898,743 | 8/1975 | Myeress | 33/293 |
| 3,907,435 | 9/1975 | Roodvoets | 356/153 |
| 4,030,832 | 6/1977 | Rando et al. | 356/152 |
| 4,272,191 | 6/1981 | Bergkvist | 356/153 |
| 4,447,962 | 5/1984 | Grosberg | 33/286 |

Primary Examiner—William D. Martin, Jr.
Attorney, Agent, or Firm—Henderson & Sturm

[57] ABSTRACT

A combined centerline target and grade checker apparatus (10) for use in aligning the centerline of a pipe segment (200) and checking the grade of a pipe trench (1), wherein the apparatus (10) comprises a target unit (12) and a support unit (13) which are movably and operatively associated with a framework unit (11) such that the apparatus (10) can be used in conjuction with a laser beam generating device (100) to function both as a grade checking device and a centerline target device.

7 Claims, 2 Drawing Sheets

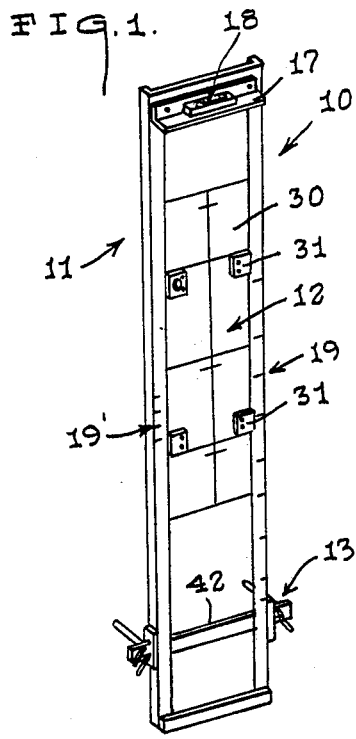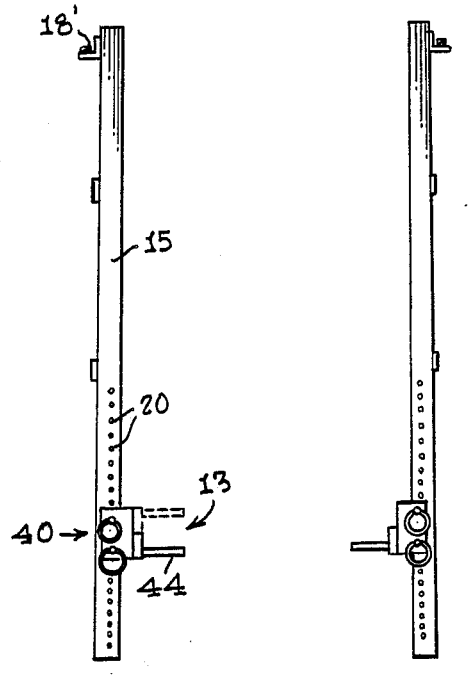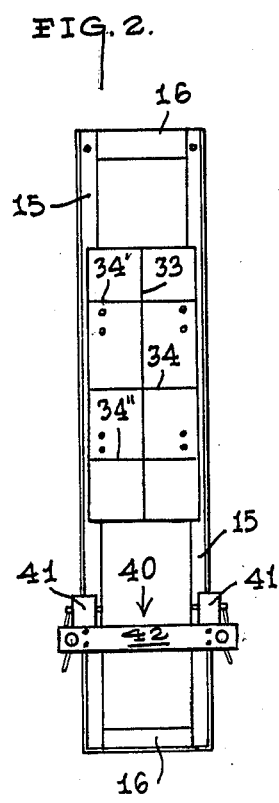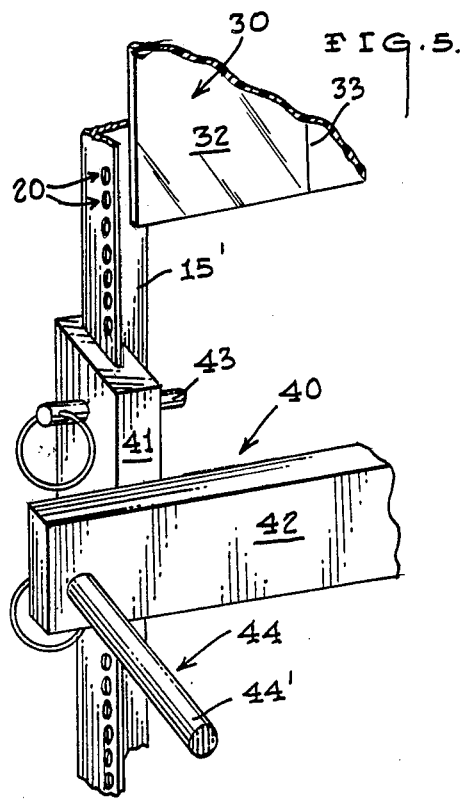

COMBINED CENTERLINE TARGET AND GRADE CHECKER APPARATUS

TECHNICAL FIELD

The present invention relates generally to pipe laying methods and apparatus.

BACKGROUND OF THE INVENTION

This invention represents a quantum leap advance in the technology that was first disclosed in my recently issued U.S. Pat. 4,681,439 dated July 21, 1987 and entitled "Pipe Laying Method and Apparatus".

As can be seen by reference to the above cited patent, as well as U.S. Pat. Nos: 3,631,601; 4,030,832; 3,907,435; 3,857,639; and 4,272,191, the prior art is replete with myriad and diverse approaches designed to simplify the task of laying pipe strings.

While all of the aforementioned prior art methods and apparatus are more than adequate for the purpose of accomplishing the end result for which they were designed and developed, these prior art patents are uniformly deficient with respect to the number of distinct structural components that are required to carry out their designated task.

A brief review of the prior art patents will quickly reveal that virtually all of the arrangements previously employed to lay a string of pipe require the use of at least two independent and structurally distinct elements to accomplish their stated goal. One of these components is designated as a centerline target and is intended and designed to be centrally disposed within the interior of a pipe segment; while the other component is designated as a grade checker, which is to be deployed at a spaced location from the pipe segment that contains the centerline target.

Obviously there has existed a long standing and as yet unsatisfied need for a single device that could perform the function and purpose of both a centerline target and a grade checker. However, it is equally obvious that none of the aforementioned prior art constructions even remotely envisioned that it would be possible to develop such a multi-function combined centerline target and grade checker apparatus.

BRIEF SUMMARY OF THE INVENTION

As suggested by its title, the present invention involves a combined centerline target and grade checker apparatus. As would be expected, this apparatus is designed to be operatively engaged with a section of pipe in one mode of operation, as well as being deployed at a spaced location from the pipe segment in its other mode of deployment.

Briefly stated, the combined centerline target and grade checker apparatus of this invention comprises: a framework unit, a movable target unit, and a movable pipe engaging support unit wherein the framework unit is further provided with leveling means for the combined apparatus.

Both the movable target unit and the movable pipe engaging support unit are operatively attached to the framework unit, whereby the selective positioning and engagement of the support unit within a pipe segment followed by the predetermined positioning of the target unit on the framework unit will calibrate the apparatus of this invention for use as both a centerline target device and a grade checking device.

BRIEF DESCRIPTION OF THE DRAWINGS

These and other objects, advantages, and novel features of the invention will become apparent from the detailed description of the best mode for carrying out the preferred embodiment of this invention which follows, particularly when considered in conjunction with the accompanying drawings, wherein:

FIG. 1 is a perspective view of the combined apparatus that forms the basis of this invention;

FIG. 2 is a front plan view of the apparatus;

FIG. 3 is a side plan view of the apparatus;

FIG. 4 is an enlarged detail view of the target unit locking mechanism of the apparatus;

FIG. 5 is an enlarged detail view of the support unit locking mechanism of the apparatus;

BEST MODE FOR CARRYING OUT THE INVENTION

Figure 6:
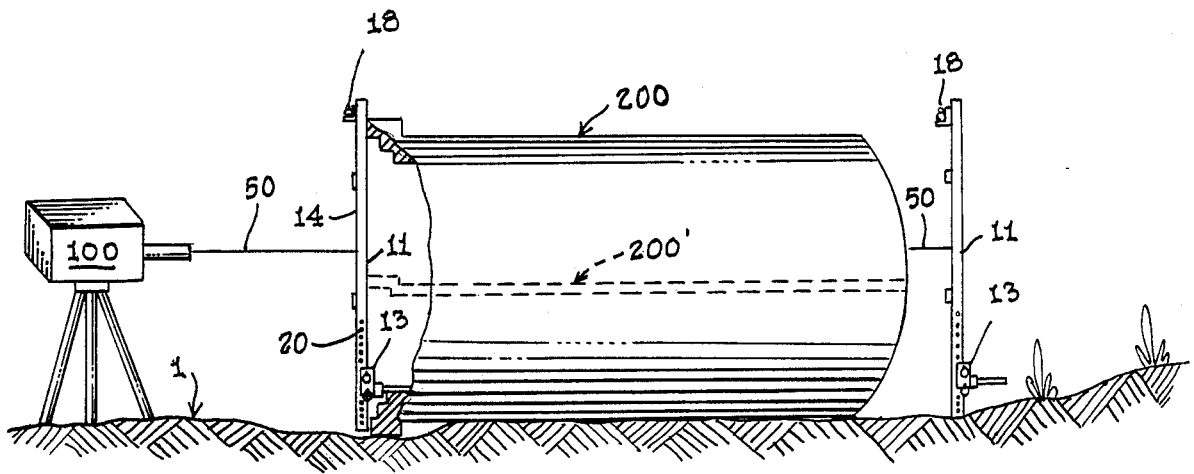
FIG. 6 is a breakaway side elevation of the apparatus in its intended environment; and, FIG. 7 is a front elevation of the apparatus in its intended environment.

As can be seen by reference to the drawings and in particular to FIG. 1, the combined centerline target and grade checker apparatus that forms the basis of the present invention is designated generally by the reference numeral (10). The combined apparatus (10) comprises in general a framework unit (11), a movable target unit (12), and a movable support unit (13). These units will now be described in seriatim fashion.

As shown in FIGS. 1 thru 3, the framework unit (11) comprises an elongated generally rectangular open framework member (14) comprising a pair of elongated apertured vertical leg elements (15) which are operatively connected to one another on their upper and lower ends by cross-piece elements (16). In addition, the upper cross-piece element (16) is further provided with a horizontally disposed ledge portion (17) having a leveling means (18) such as fluid level (18') disposed thereon.

As can best be seen by reference to FIG. 1, each of the vertical leg elements (15) of the framework member (14) are provided with diverse indicia means (19)(19') representative of vertical height relative to specific reference points. Furthermore, as shown in FIGS. 2 and 5, each of the vertical leg elements (15) comprise a generally L-shaped angle iron segment (15') wherein the sides of the leg elements (15) are provided with a plurality of equidistantly spaced and vertically aligned apertures (20) and the face of the leg elements (15) bear the indicia means (19)(19').

As can also be appreciated by reference to FIGS. 1, 2, and 5, the movable target unit (12) comprises a generally elongated rectangular target member (30) provided with releasable locking means (31) that are adapted to operatively and slideably engage the target member (30) relative to the vertical leg elements (15) of the framework member (14). In addition, the target member (30) is fabricated from a generally opaque sheet of material (32) chosen from a class of materials capable of distortion free passage of a focused laser beam (50); wherein the face of the target member (30) is provided with at least one centrally disposed vertical reference line (33) and at least one horizontally disposed reference line (34).

The movable support unit (13) can best be appreciated by reference to FIGS. 2, 3, and 5, wherein the support unit (13) comprises a support member (40) including a pair of slotted bracket elements (41) having a plurality of apertures (42) dimensioned to receive a plurality of releasable locking pin elements (43) for releasably securing the bracket elements (41) to the vertical leg element (15) of the framework member (14). In addition, the support member (40) further comprises an elongated horizontal cross-bar element (42) rigidly secured between the bracket elements (41) and being disposed in a flush relationship with one of the ends of each of the bracket elements, wherein the horizontal cross-bar element (42) projects beyond the sides of the vertical legs (150 of the framework member (14).

Furthermore, the cross-bar element (42) is provided with a pair of horizontally disposed and spaced apart elongated members (44) in the form of rod elements (44') which project rearwardly of the support unit (13) and outwardly relative to the vertical leg elements (15) of the framework member (14). As can also be seen by reference to FIG. 3, the support unit (13) may be operatively connected to the framework unit (11), such that the elongated rod members (44) will be located on either the top or the bottom of the support unit (13) depending upon the particular orientation chosen by the user.

At this point it should be appreciated that both the target unit (12) and the support unit (13) are selectively movable relative to one another and to the framework unit (11). It should also be appreciated that in the preferred embodiment of the invention depicted in FIGS. 1, 2, and 7, the target unit is provided with a plurality of horizontally disposed reference lines (34)(34') and (34") which are vertically spaced relative to one another on the target member (30).

Figure 7:
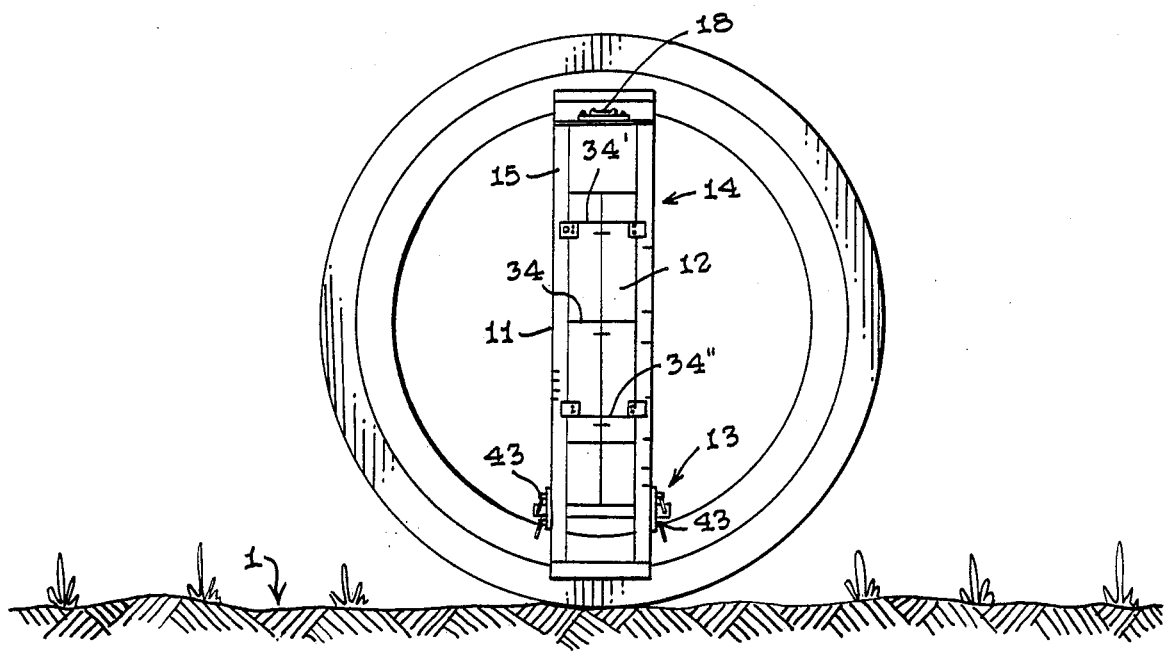

As can best be appreciated by reference to FIGS. 6 and 7, the combined apparatus (10) of this invention can function both as a grade checker device or as a centerline target device by virtue of the unique cooperation that exists between the framework unit (11), the target unit (12), and the support unit (13). As shown in FIG. 6, the combined apparatus (10) is intended to be used in conjunction with a laser beam generating apparatus (100) and a pipe segment (200) for the purpose of laying a string of pipe.

Once the laser beam generating device (100) has been prepositioned to project a laser beam (50) at the desired height and direction of the pipe string, the apparatus (10) is then employed to insure that each pipe segment (200) is centrally disposed relative to the beam (50) and that the grade downstream of the laser device (100) and the last pipe segment (200) is at the proper depth to accept succeeding pipe segments.

Since the apparatus (10) is specifically designed to facilitate the laying of pipe strings having different diameter pipe segments (200)(200') the centerline target function of the apparatus (10) requires the most precalibration of the support unit (13) and the target unit (12) relative to the framework unit (11). As shown on the left hand side of FIG. 6 and FIG. 7, the support unit (13) is positioned a selected height above the bottom of the framework unit (11) such that the target unit (12) may be positioned on the framework unit (11) to bring one of the horizontal reference lines (34)(34') or (34") into alignment with the longitudinal axis of the particular pipe segment (200) or (200'). In order to position the support unit (13) at the proper height, the elongated rod members (44) of the support member (40) must be projecting into and resting on the interior lower surface of the pipe segment (200), wherein the locking pin elements (43) are disposed in aligned apertures (20) in the vertical leg elements (15) of the framework member (14). Whenever the laser beam (50) impinges either above or below the selected centerline on the target unit (13) the leveling means (18) on the framework unit (11) is then employed to check the orientation of the apparatus (10) to determine the extent of the axial misalignment between the longitudinal axis of the pipe segment (200) and the laser beam (50).

Once the centerline of the first pipe segment (200) has been established, the apparatus (10) may then function as a grade checker as shown on the right hand side of FIG. 6. In this mode of deployment, it is only necessary to move the target unit (13) relative to the framework unit (11) such that in a vertical orientation the laser beam (50) should impinge on a selected one of the horizontal reference lines (34) on the target unit (13) if the apparatus (10) is resting on the proper grade. Obviously if the laser beam (50) impinges above or below the selected horizontal reference line (34), additional excavation or backfilling of the pipe trench (1) would be required.

Having thereby described the subject matter of this invention, it should be obvious that many substitutions, modifications, and variations of the invention are possible in light of the above teachings. It is therefore to be understood that the invention as taught and described herein is only to be limited to the extent of the breadth and scope of the appended claims.

I claim:

1. A combined centerline target and grade checker apparatus for use with a laser beam generating device, and a pipe segment for verifying the proper grade of a pipe trench and aligning a pipe segment in a pipe string, wherein the apparatus comprises:

a framework unit including a generally elongated rectangular open framework member comprising a pair of elongated apertured vertical leg elements connected together on their upper and lower ends by cross-piece elements; wherein, each of the vertical leg elements comprise a generally L-shaped angle iron segment wherein the sides of the angle iron segment are provided with a plurality of equidistantly spaced and vertically aligned apertures and the face of the angle iron segment is provided with indicia representative of vertical height;

a target unit operatively associated with said framework member, wherein said target unit is provided with at least one horizontally disposed reference line and further includes releasable locking means for selectively positioning the target unit on said framework unit; and, a movable support unit operatively associated with said framework unit and comprising a support member having a pair of elongated horizontally and rearwardly disposed members adapted to engage the interior surface of a pipe segment, and further including releasable locking elements for selectively positioning the movable support unit relative to said framework unit.

2. The apparatus as in claim 1, wherein said framework member is further provided with a leveling means.

3. The apparatus as in claim 1, wherein the indicia on each of the vertical leg elements are different.

4. The apparatus as in claim 1, wherein the target unit is provided with a plurality of horizontal reference lines.

5. The apparatus as in claim 1, wherein the support member comprises a pair of bracket elements connected together by a horizontally disposed cross-bar element, wherein the bracket elements are adapted to slidingly engage the vertical leg elements of the framework member.

6. The apparatus as in claim 1, wherein the pair of elongated members on said support unit comprise rod elements.

7. A combined centerline target and grade checker apparatus for use with a laser beam generating device, and pipe segment for verifying the proper grade of a pipe trench and aligning a pipe segment in a pipe string, wherein the apparatus comprises:

a framework unit including a generally elongated rectangular open framework member;

a target unit operatively associated with said framework member, wherein said target unit is provided with at least one vertically disposed reference line and at least one horizontally disposed reference line and further includes releasable locking means for selectively positioning the target unit on said framework unit; and, a support unit operatively and movably associated with said framework unit and comprising a support member having a pair of elongated horizontally and rearwardly disposed members adapted to engage the interior surface of a pipe segment, and further including releasable locking elements for selectively positioning the movable support unit relative to said framework unit; wherein, said rearwardly disposed members will support said framework unit on the exterior surface of said pipe segment.

* * * * *